(12) United States Patent
Lee

(10) Patent No.: US 6,679,145 B1
(45) Date of Patent: Jan. 20, 2004

(54) DUST COLLECTOR FOR BAND SAWING MACHINE

(75) Inventor: Lien-Chu Lee, Taichung Hsien (TW)

(73) Assignee: OAV Equipment Tools, Inc., Taichung Hsien (TW)

( * ) Notice: Subject to any disclaimer, the term of this patent is extended or adjusted under 35 U.S.C. 154(b) by 0 days.

(21) Appl. No.: 10/359,568

(22) Filed: Feb. 7, 2003

(51) Int. Cl.⁷ .................................................. B26D 7/06
(52) U.S. Cl. ........................ 83/100; 83/788; 144/252.2
(58) Field of Search ..................... 83/100, 788; 416/60; 451/449; 144/252.1, 252.2

(56) References Cited

U.S. PATENT DOCUMENTS

| | | | | |
|---|---|---|---|---|
| 1,218,301 A | * | 3/1917 | Nesbitt ..................... 144/134.3 |
| 1,496,035 A | * | 6/1924 | Thomson ..................... 83/168 |
| 1,789,569 A | * | 1/1931 | Tannewitz ............... 144/252.1 |
| 2,579,955 A | * | 12/1951 | Orescan ....................... 83/100 |
| 3,669,163 A | * | 6/1972 | Crane ........................... 83/100 |
| 4,491,047 A | * | 1/1985 | Butkiewicz et al. .......... 83/100 |
| 4,517,939 A | * | 5/1985 | Kiyooka ..................... 416/185 |
| 5,713,164 A | * | 2/1998 | Ryan ......................... 52/169.7 |
| 5,802,939 A | * | 9/1998 | Wiand et al. .................. 83/169 |
| 6,244,144 B1 | * | 6/2001 | Goldie ............................ 83/13 |
| 6,293,321 B1 | * | 9/2001 | Chiang ..................... 144/252.1 |
| 6,382,278 B1 | * | 5/2002 | Liao et al. ............... 144/252.1 |
| 6,405,406 B1 | * | 6/2002 | Chen ........................... 83/100 |
| 6,416,403 B1 | * | 7/2002 | Chiang ....................... 451/453 |
| D478,602 S | * | 8/2003 | Lee ........................... D15/134 |

* cited by examiner

Primary Examiner—Allan N. Shoap
Assistant Examiner—Jason Prone
(74) Attorney, Agent, or Firm—Browdy and Neimark, P.L.L.C.

(57) ABSTRACT

A dust collector includes a mounting seat mounted outside dust outlets of a housing of a band sawing machine, a boosting unit received in the mounting seat, and a dust collecting member. The mounting seat has an axial portion and a through hole passing through the axial portion. The boosting unit includes a rotor and a fan blade. The rotor has a body portion rotatably mounted through the through hole of the mounting seat and fitted to the fan blade at a distal end thereof, and a head portion connected with a transmission shaft of a drive motor of the band sawing machine. The dust collecting member is connected with the mounting seat and includes a receiving space. Accordingly, the dust collector is synchronically activated together with the band sawing machine to run for collecting sawdust.

7 Claims, 3 Drawing Sheets

DUST COLLECTOR FOR BAND SAWING MACHINE

BACKGROUND OF THE INVENTION

1. Field of the Invention

The present invention relates generally to band sawing machines, and more particularly to a dust collector, which enables a band sawing machine to additionally collect dust so as to enhance working efficiency.

2. Description of the Related Art

A regular band sawing machine is composed of an upper roller, a lower roller, and an annular band saw running tight on the two rollers. The band sawing machine includes a workbench through which the band saw is put, and a driver motor at a bottom side thereof as a driving source for driving the two rollers and the band saw to run.

However, while the band sawing machine is working, sawdust produced by the band saw sawing workpieces will mostly be adhered to between saw teeth of the band saw and move downwards along with the band saw, thereby causing the sawdust piled up at the bottom side of the band sawing machine. If the sawdust is not cleaned up in time, while a great amount of the sawdust is produced and piled up, the lower roller will be hindered to run or even damaged by the sawdust, thereby reducing the working efficiency and the durability of the band sawing machine.

Although breaking up the working procedure periodically to clean up the accumulated sawdust by manpower can resolve the above problems, it will also take more procedures and much more time, thereby causing inefficiency and increasing production cost.

Alternatively, installing a dust collecting machine, which dust collecting tube is mounted on a top side of the workbench, for collecting the sawdust at the same time while the band sawing machine is working and for preventing the sawdust from piled up at the bottom side of the band sawing machine may also solve the above problems. However, the dust collecting machine and the band sawing machine are respectively driven by a power source, and accordingly, while they are operated at the same time, a great amount of energy and occupied space of the two power sources will result in huge growth of the production cost.

SUMMARY OF THE INVENTION

It is the primary objective of the present invention to provide an improved dust collector, which is driven by a power source the same as the one driving a band sawing machine so as to economize energy and to reduce cost.

It is another objective of the present invention to provide an improved dust collector, which can clean up sawdust effectively while a band sawing machine is working, thereby enhancing the working efficiency of the band sawing machine.

It is still another objective of the present invention to provide an improved dust collector, which prevents a band sawing machine from working interferingly or damage resulted from excessive accumulated sawdust.

The foregoing objectives of the present invention are attained by the dust collector comprising a mounting seat mounted outside dust outlets of a housing of a band sawing machine, a boosting unit received in the mounting seat, and a dust collecting member. The band sawing machine includes a drive motor mounted at a bottom side of the housing thereof. The mounting seat has an axial portion and a through hole passing through the axial portion. The boosting unit includes a rotor and a fan blade. The rotor has a body portion rotatably mounted through the through hole of the mounting seat and fitted to the fan blade at a distal end thereof, and a head portion connected with a transmission shaft of the drive motor of the band sawing machine such that the fan blade is driven by the motor to run. The dust collecting member is connected with the mounting seat and includes a receiving space. Accordingly, the dust collector is synchronically activated together with the band sawing machine to run for collecting sawdust.

DETAILED DESCRIPTION OF THE INVENTION

Figure 1:
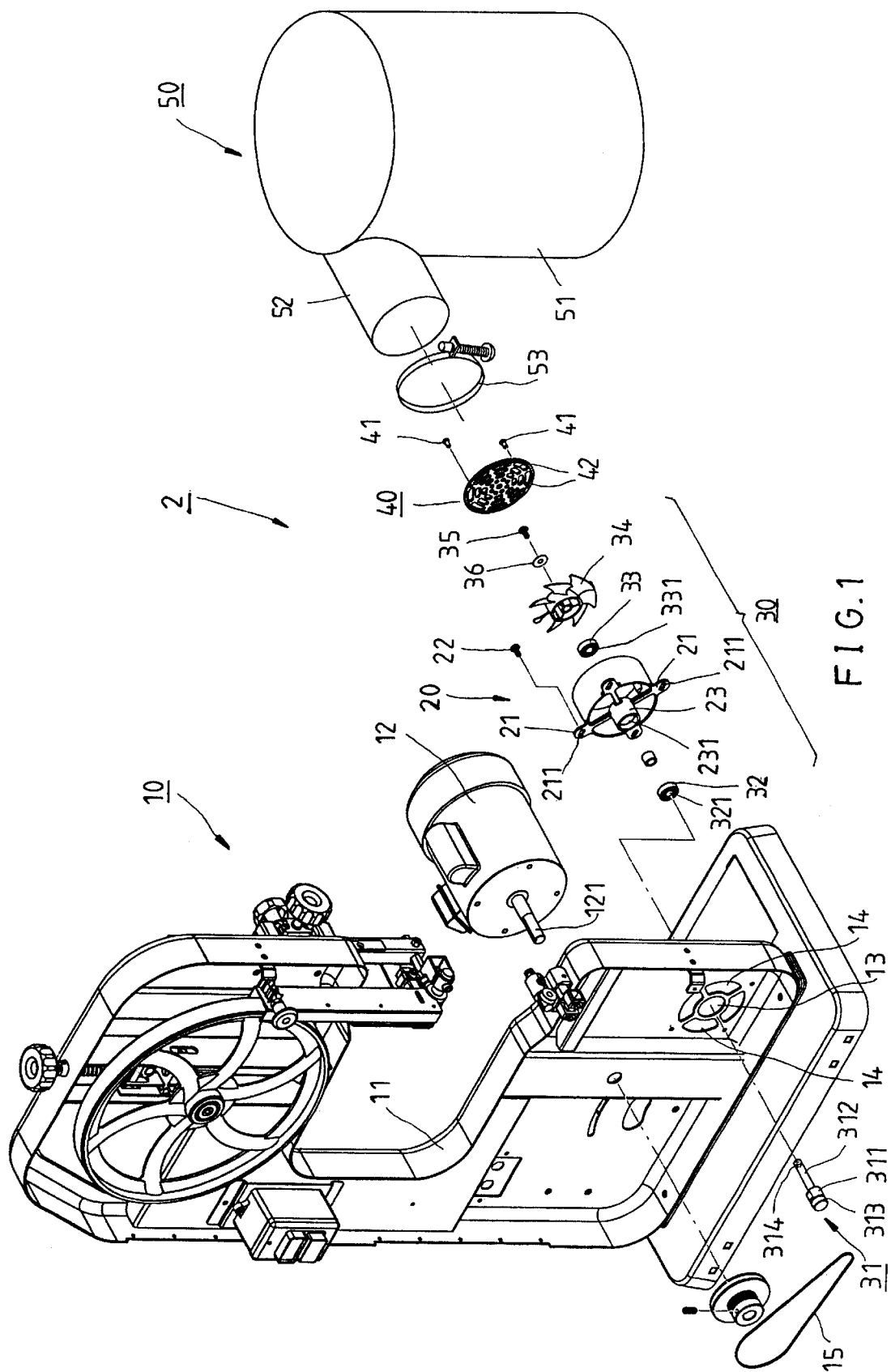
FIG. 1 is an exploded view of a preferred embodiment of the present invention mounted on a band sawing machine.
Figure 2:
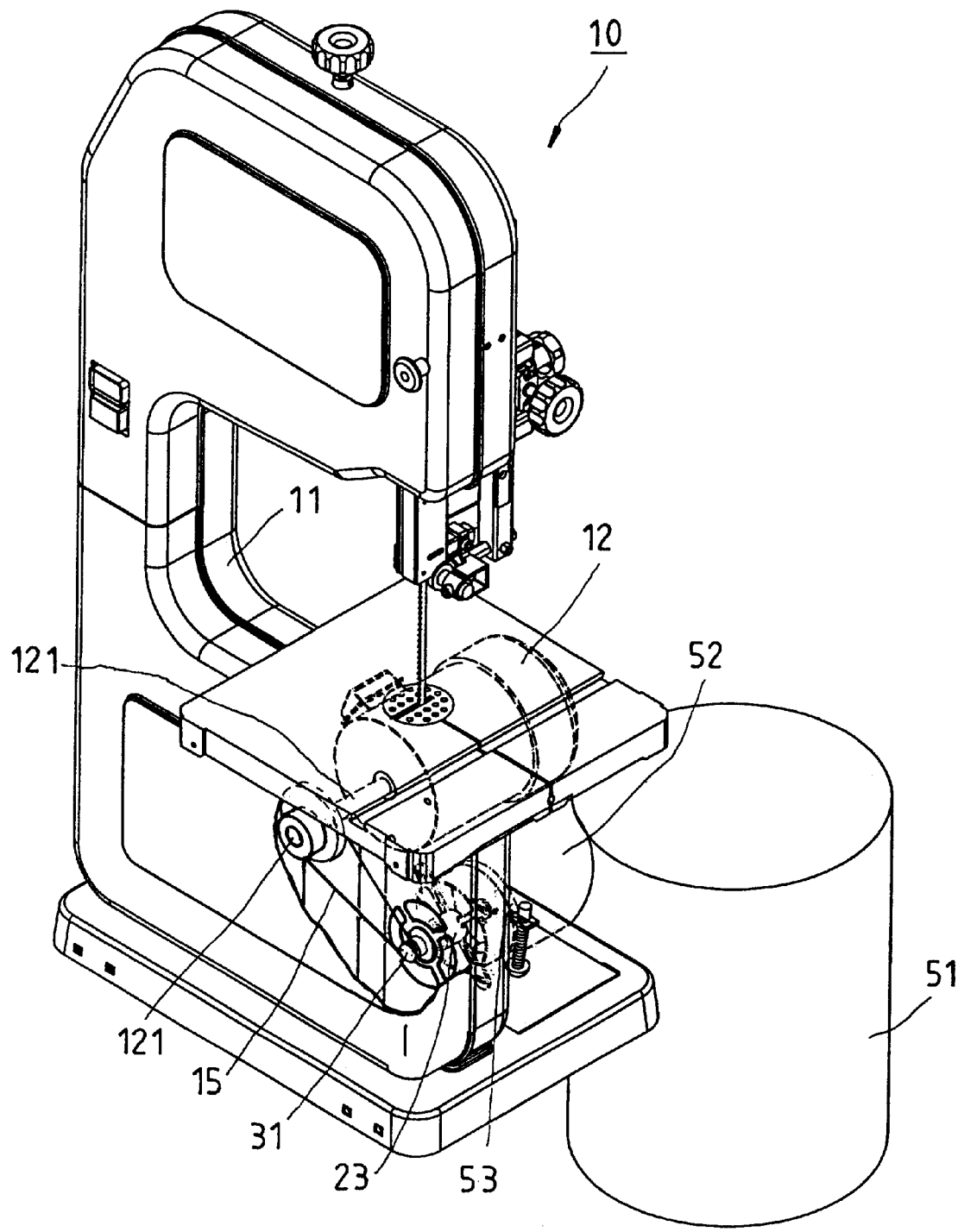
FIG. 2 is a perspective view of the preferred embodiment of the present invention mounted on the band sawing machine.
Figure 3:
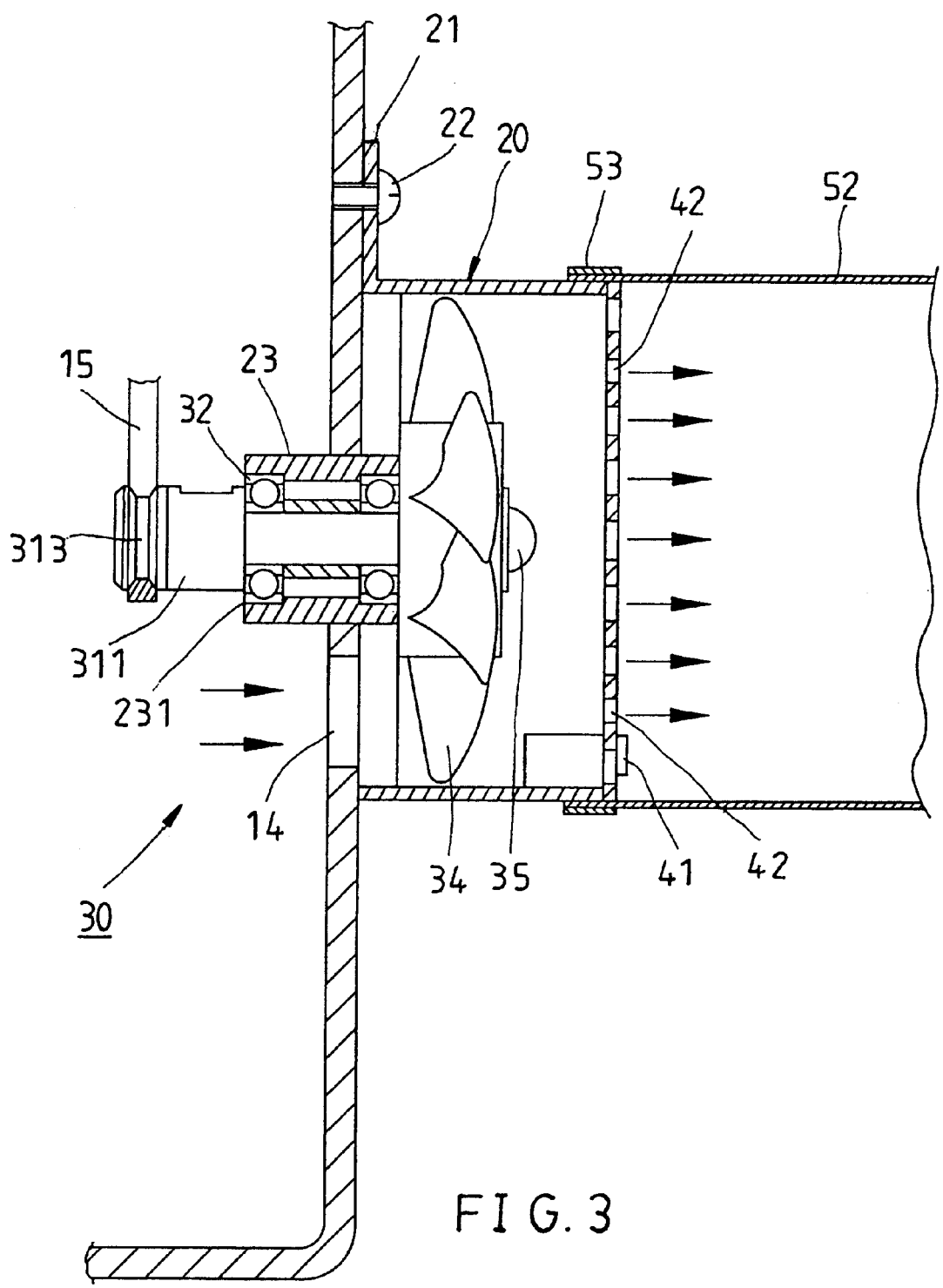
FIG. 3 is a partial sectional view of the preferred embodiment of the present invention.

Referring to FIGS. 1–3, a preferred embodiment of the present invention provides a dust collector 2, which is mounted at a bottom lateral side of a housing 11 of a band sawing machine 10. The band sawing machine 10 includes a drive motor 12 at the bottom side of the housing 11 for a power source, and the housing 11 having an axial hole 13 at a side thereof and a predetermined numbers of dust outlets 14 around the axial hole 13. While the band sawing machine 10 is working, an amount of sawdust will be produced. The dust collector 2 is composed of a mounting seat 20 fastened to the housing and outside the axial hole 13, a boosting unit 30 rotatably mounted to an axis of the mounting seat 20, a fan guard 40 mounted at a side of the mounting seat 20, and a dust collecting member 50.

The mounting seat 20, which is cylindrical and hollow, includes two openings, four ears 21 extending outwards from one of the openings, and a cylindrical axial portion 23 extending from a position thereof facing the axial hole 13 of the housing 11. Each of the four ears 21 is provided with a through hole 211 for inserting screws 22 therethrough such that the mounting seat 20 is fixedly mounted to a side of the housing 11 of the band sawing machine 10. The axial portion 23 is inserted through the axial hole 13 and has a through hole 231.

The boosting unit 30 includes a rotor 31, two bearings 32 and 33, and a fan blade 34. The rotor 31 has a head portion 311 and a body portion 312, wherein the head portion 311 has a larger diameter than that of the body portion 312, and the body portion 312 extends outwards from the center of the head portion 311. The head portion 311 has an annular recessed portion 313 at a periphery thereof to be connected with a transmission shaft 121 of the motor 12 by a transmission belt 15 so as to run along with the transmission shaft 121. The body portion 312 is further axially provided with a threaded hole 314 at a distal end. The two bearings 32 and 33 are respectively embedded into two ends of the through hole 231 of the axial portion 23 and have two orifices 321 and 331 for inserting and rotatably connecting the body portion 312 of the rotor 31 in suitable tightness. The fan blade 34 is firmly fitted on body portion 312 of the rotor 31 by means of a washer 36 fitted on the body portion and a screw 35 threaded into the threaded hole 314 such that the fan blade can be driven to rotate by the rotor 31.

The fan guard 40, which is shaped like a circular sheet and is threadedly mounted to the mounting seat 20 by two screws 41, includes a predetermined numbers of screen apertures 42 for the sawdust running therethrough and for preventing a user's hands from carelessly touching the fan blades 34.

The dust collecting member 50 includes a canister 51 having a receiving space for storing the sawdust, and a connection tube 52 having an opening and extending outwards from the canister 51. The opening of the connection tube 52 is connected with a periphery of a distal end of the mounting seat 20 by a fastening ring 53 mounted therebetween.

While the band sawing machine 10 is activated to work, the transmission shaft 121 of the motor 12 drives a driving wheel (not shown) to rotate. At the same time, the transmission shaft 121 synchronically drives the rotor 31 of the boosting unit 30 to rotate via the transmission belt 15 and further drives the fan blade 34 to rotate, as illustrated in FIG. 3. Suction is generated while the fan blade 34 is rotated for drawing the sawdust. As indicated by arrowheads in FIG. 3, the sawdust is extracted from the dust outlet 14 of the band sawing machine 10 and through the mounting seat 20 and the connection tube 52 of the dust collecting member 50 and then into the receiving space of the canister 51 of the dust collecting member 50.

In conclusion, the present invention can effectively clean up the sawdust produced by the band sawing machine so as to further enhance the working efficiency and to prevents the band sawing machine from working interferingly or damage resulted from excessive accumulated sawdust. In addition, the present invention is powered by the same motor by which the band sawing machine is powered such that no great amount of energy will be consumed so as to reduce the product cost effectively.

What is claimed is:

1. A dust collector mounted on a bottom lateral side of a housing of a band sawing machine, wherein said band sawing machine has a motor mounted on the bottom side of the housing and said housing has an axial hole at a side thereof and a plurality of dust outlets around said axial hole, said dust collector comprising:

a cylindrical mounting seat mounted to said housing at an end thereof and located outside said dust outlets, said mounting seat having an axial portion extending inwards and a through hole passing through said axial portion;

a boosting unit received in said mounting seat and having a rotor and a fan blade, said rotor having a head portion and a body portion rotatably mounted through said through hole of said axial portion of said mounting seat and fitted to said fan blade, said head portion being connected with a transmission shaft of said motor and driven to rotate by said motor; and a dust collecting member connected with a periphery of a distal end of said mounting seat and having a receiving space inside.

2. The dust collector as defined in claim 1, wherein said rotor of said boosting unit is connected with said transmission shaft of said motor via a transmission belt.

3. The dust collector as defined in claim 1, wherein said axial portion of said mounting seat is inserted into said axial hole of said housing.

4. The dust collector as defined in claim 1, wherein said through hole of said axial portion of said mounting seat is disposed with two bearings at two ends thereof, and said body portion of said rotor is inserted through and connected with said bearings.

5. The dust collector as defined in claim 1, wherein said mounting seat includes four ears extending outwards from a distal peripheral fringe so as to be threadedly mounted to said housing and located outside said dust outlet of said housing by means of screws.

6. The dust collector as defined in claim 1, wherein said dust collecting member includes a connection tube extending outwards therefrom for interconnecting said mounting seat via a fastening ring mounted therebetween.

7. The dust collector as defined in claim 1, further comprising a fan guard mounted to the distal peripheral fringe of the mounting seat, said fan guard having a plurality of screen apertures thereon.

* * * * *